United States Patent [19]

Renker

[11] Patent Number: 5,349,757
[45] Date of Patent: Sep. 27, 1994

[54] TAPE-SUSPENDED MERIDIAN GYRO

[75] Inventor: Horst Renker, Überlingen-Nussdorf, Fed. Rep. of Germany

[73] Assignee: Bodenseewerk Gerätetechnik GmbH, Bodensee, Fed. Rep. of Germany

[21] Appl. No.: 76,800

[22] Filed: Jun. 15, 1993

[30] Foreign Application Priority Data

Jun. 20, 1992 [DE] Fed. Rep. of Germany ....... 4220279

[51] Int. Cl.⁵ .............................................. F01C 19/38
[52] U.S. Cl. ......................................... 33/316; 33/324
[58] Field of Search ................ 33/316, 318, 320, 324, 33/326, 328, 329, 391, 402

[56] References Cited

U.S. PATENT DOCUMENTS

| | | | |
|---|---|---|---|
| 2,492,148 | 12/1949 | Herbold | 33/320 |
| 3,206,864 | 9/1965 | Sanchirico et al. | 33/324 |
| 3,279,086 | 10/1966 | Schlitt et al. | 33/324 |
| 3,758,952 | 9/1973 | Fischel | 33/324 |
| 3,936,948 | 2/1976 | Maselli | 33/324 |
| 3,938,256 | 2/1976 | Crocker, Jr. | 33/318 |
| 4,071,959 | 2/1978 | Russell et al. | 33/318 |
| 5,115,570 | 5/1992 | Kragmann et al. | 33/326 |

FOREIGN PATENT DOCUMENTS 2124357 11/1976 Fed. Rep. of Germany .

*Primary Examiner*—William A. Cuchlinski, Jr.
*Assistant Examiner*—G. Bradley Bennett
*Attorney, Agent, or Firm*—Lowe, Price, LeBlanc & Becker

[57] ABSTRACT

A tape-suspended meridian gyro has an outer housing, an intermediate housing movably mounted in the outer housing and a gyro having substantially horizontal spin axis. The gyro is suspended by means of a tape within the intermediate housing. A pick-off detects the deflection of a substantially vertical upward axis from its central position. The intermediate housing can be moved by servo motors transversely to the substantially vertical upward axis of the gyro. The servo motors are energized by the pick-off through a controller to damp pendulous oscillations of the tape-suspended gyro.

8 Claims, 3 Drawing Sheets

TAPE-SUSPENDED MERIDIAN GYRO

The invention relates to a tape-suspended meridian gyro comprising an outer housing, an intermediate housing movably mounted in said outer housing, a gyro having a substantially horizontal spin axis, said gyro being suspended in said intermediate housing by means of a tape, and a pick-off which responds to deflection of said gyro.

Such a tape-suspended meridian gyro is, for example, known from German patent 2,124,357. This meridian gyro has an intermediate housing, which is rotatable about a vertical axis of the gyro. The gyro is suspended from a tape in this intermediate housing, the spin axis of the gyro being substantially horizontal. To this end the gyro housing, in which the gyro rotor is mounted and is driven about the spin axis, has a rigid mast perpendicular to the spin axis. This mast is connected to a tape, which is attached to the center of the upper end wall of the intermediate housing. Then the tape is substantially vertical, the spin axis is substantially horizontal. The expression "substantially" herein means that slight deviations from the desired vertical or horizontal, respectively, orientation due to oscillations or other interferences may occur. The present invention is just directed to the damping of such oscillations.

A pick-off is provided in the prior art meridian gyro. This pick-off responds to deviations of the gyro about its vertical axis, i.e. about the axes of the mast and the tape. Such a deviation is caused by a "gyro directional torque", which, in turn, is caused by the rotation of the earth and seek to align the spin axis with North. The pick-off signal is amplified and applied to a torquer acting about the vertical axis. Thereby the gyro directional torque is compensated. The current flowing through the torquer to achieve such compensation provides a measure of the angle between spin axis and North.

The intermediate housing is rotated through this angle iteratively after each measurement, until the spin axis is aligned with North.

Usually, the outer housing of tape-suspended meridian gyros is adjusted, by means of a bubble level, to be exactly horizontal.

The determination of North by means of a tape-suspended meridian gyro offers a particularly favorable relation between accuracy and required measuring time. A disadvantage of tape-suspended meridian gyros is the fact that nearly undamped pendulous oscillations can be incited, thus oscillations causing the tape to deviate from the vertical. Such pendulous oscillations may result in measuring errors due to the "rectifying" of harmonic accelerations. Therefore, tape-suspended meridian gyros are, in general, used on firm, nonvibrating ground only. The use of meridian gyros on vibrating vehicles involves considerable problems.

It is the object of the invention to damp pendulous oscillations of a tape-suspended meridian gyro of the type defined in the beginning and to make the meridian gyro less susceptible to outside interferences.

A more specific object of the invention is to provide a tape-suspended meridian gyro of the type defined in the beginning, which can be used in a vehicle.

According to the invention said pick-off is arranged to detect transverse deflection of a substantially vertical upward axis of said gyro from its central position. Said intermediate housing is arranged to be moved by servo motor means transversely to said substantially vertical upward axis of said gyro. Said servo motor means are arranged to be energized by said pick-off through a controller to damp pendulous oscillations of said tape suspended gyro.

In contrast to the meridian gyro of German patent 2,124,357, the pick-off of the invention detects the lateral deflection of the upward axis. Thus pendulous oscillations caused by outside interferences are detected. The intermediate housing is not rotated but is moved transversely to the vertical axis to damp such pendulous oscillations.

It has been found that damping of the pendulous oscillations can be achieved by appropriately applying the pick-off signals to the servo motor means while taking into account the natural frequency of the system containing the intermediate housing.

The invention can be reduced to practice in various ways.

In one preferred embodiment, said intermediate housing comprises a carriage which is guided in said outer housing for horizontal movement with two degrees of freedom. Said carriage is restrained in a central position by means of springs. Said servo motor means comprise two linear actuators which act upon said carriage in two mutually orthogonal, horizontal directions. Preferably said actuators are moving coils. Deflection of said vertical upward axis of said gyro from its central position is detected by a carriage-fixed pick-off.

In another preferred embodiment, said intermediate housing is provided on an inner gimbal which is pivotally mounted about a first cardan axis in an outer gimbal, said outer gimbal, in turn being pivotally mounted in said outer housing about a second cardan axis, which is orthogonal to said first cardan axis. Said servo motor means comprise a first torquer acting between said inner gimbal and said outer gimbal about said first cardan axis, and a second torquer acting between said outer gimbal and said outer housing about said second cardan axis. Said inner gimbal is resiliently restrained in a central position in said outer housing. Said pick-off is attached to said outer housing to respond, on one hand, to deflections of a longitudinal axis of said tape from a central position about a first axis, and to respond, on the other hand, to deflections of said tape axis about a second axis perpendicular to said first axis, said pick-off being connected to apply corresponding signals to said first and second torquers, respectively. Said pick-off is located in the point of intersection of said cardan axes.

Two embodiments of the invention are described in greater detail hereinbelow with reference to the accompanying drawings.

Figure 1:
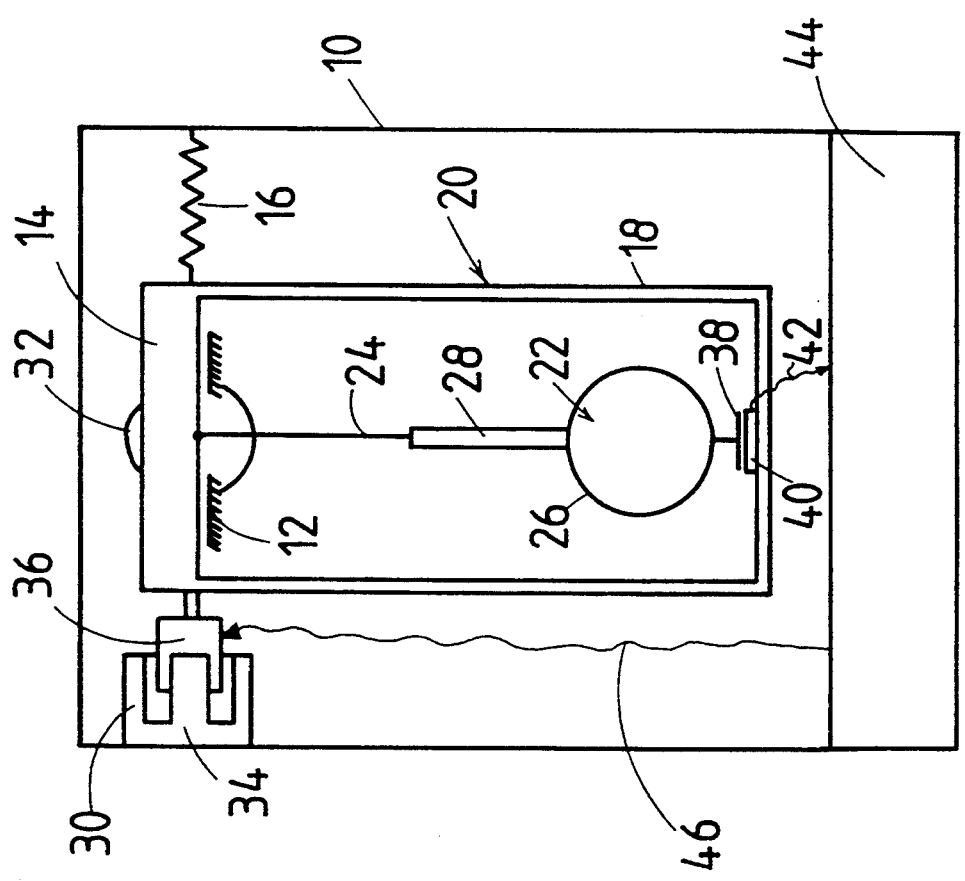
FIG. 1 is a schematic illustration of a first embodiment of a tape-suspended meridian gyro providing for damping of pendulous oscillations.

In the embodiment of FIG. 1, reference numeral 10 designates an outer housing. An easy-running guide 12 for a carriage 14 is provided on the outer housing. The guide 12 permits horizontal movement of the carriage 14 both parallel to the plane of the paper of FIG. 1 and normal to the plane of the paper of FIG. 1.

In the absence of outside forces, the carriage is held in its central position by springs 16. The carriage 14 together with a cup-shaped housing portion 18 attached to the bottom of the carriage forms an intermediate housing 20. A gyro 22 is suspended from the carriage 14 by means of a tape 24. The gyro has a gyro housing 26. A gyro rotor (not visible) is mounted in the gyro housing 26. The spin axis of the gyro rotor is substantially horizontal and, in the present illustration, extends normal to the plane of the paper in FIG. 1. A mast 28 is rigidly attached to the gyro housing 26 normal to the spin axis. The mast 28 is connected to the tape 24. The mast is substantially vertical.

Servo motor means in the form of two linear actuators 30 and 32 act upon the carriage 14. The actuator 30 acts horizontally in the plane of the paper in FIG. 1. Actuator 32 acts horizontally normal to the plane of the paper in FIG. 1. The actuators are designed like moving coils. The actuator 30 has a cup core 34 and a coil 36 movable relative thereto. The actuator 32 is of identical design.

The armature 38 of a pick-off 40 is attached to the gyro housing on the lower side thereof opposite the mast 28. The stator of the pick-off 40 is located on the lower end wall of the housing portion 18. The pick-off 40 provides signals depending on the lateral deflections of the tape-suspended gyro 22 in two mutually orthogonal directions relative to the intermediate housing 20, namely in the plane of the paper of FIG. 1 and normal thereto. The signals of the pick-off 40 are applied through flexible lead 42 to a controller 44 located in the outer housing 10. The controller 44 provides control signals which are applied to the coils 36 of the actuators 30 and 32 through flexible leads, of which only one lead 46 is shown in FIG. 1.

The arrangement described operates as follows:

If pendulous oscillations of the pendulum formed by tape 24 and gyro 22 are incited and the gyro, thereby, is deflected out of its central position transversely to its upward axis, the pick-off 40 provides signals indicative thereof. These signals are applied to the actuators 30 and 32 through the controller 44. Thereby, the carriage 14 is rocked laterally. The intermediate housing 20 formed by the carriage 14 and the cup-shaped housing portion 18 together with the springs 16 defines an oscillatory system. The signals from the pick-off 40 are applied to the actuators 30 and 32 in such a way that the movement of the intermediate housing 20 counteracts the incited pendulous oscillation and damps the pendulous oscillation.

North can be determined with the gyro 22 in conventional manner. The gyro directional torque caused by the rotation of the earth seeks to align the spin axis of the gyro with North. To determine North, the torsional oscillations of the tape-suspended gyro about the vertical, upward axis can be observed. It is also possible to compensate the gyro directional torque by a countertorque of a torquer acting about the upward axis of the gyro, the current supplied to the torquer providing a measure of the angle between spin axis and North. Eventually, the gyro may be rotated iteratively into North direction, as described in German patent 2,124,357.

Figure 2:
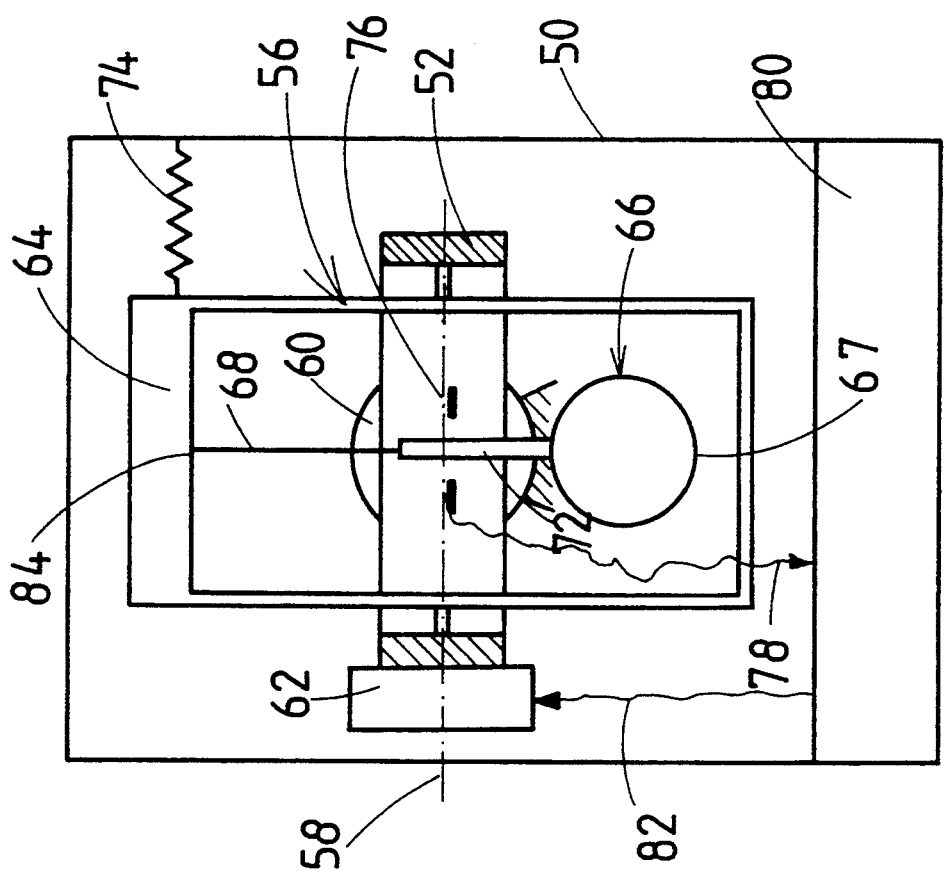
FIG. 2 is an illustration similar to FIG. 1 of a second embodiment of a tape-suspended meridian gyro.
Figure 3:
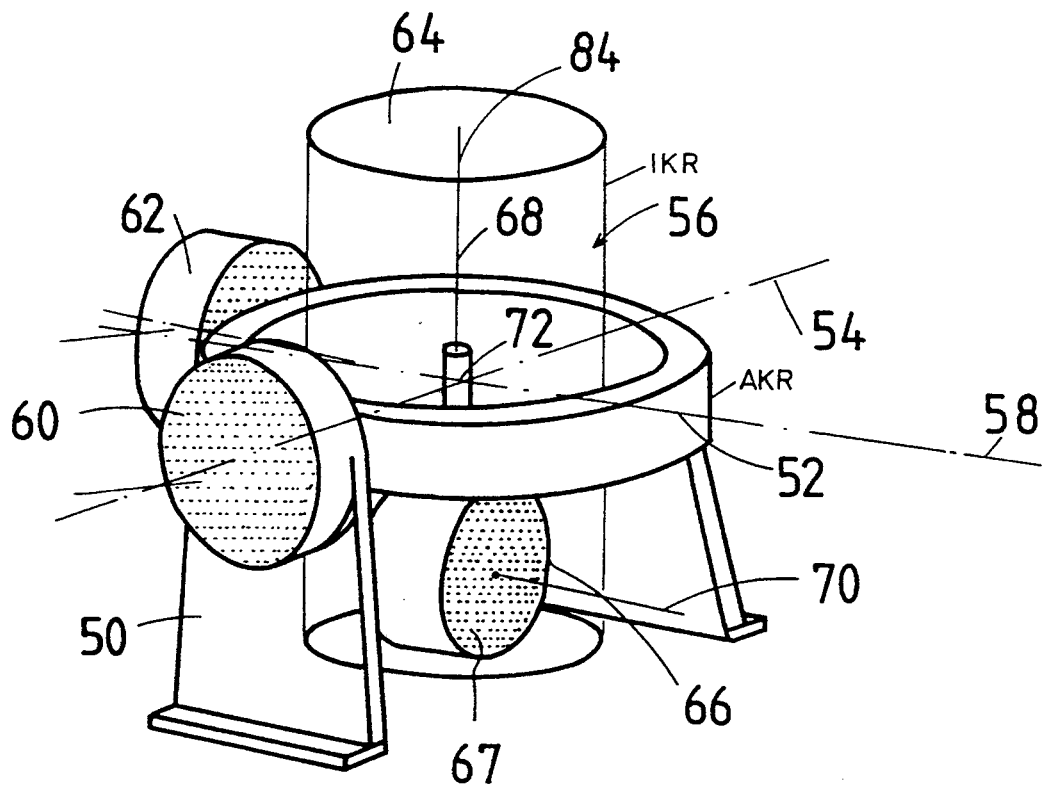
FIG. 3 is a schematic-perspective illustration of the tape-suspended meridian gyro of FIG. 2.

Referring now to FIGS. 2 and 3, numeral 50 designates an outer housing. An outer gimbal 52 is pivotally mounted about a cardan axis 54 (FIG. 3) in the outer housing 50. In FIG. 2, the cardan axis 54 extends normal to the plane of the paper. An inner gimbal 56 is pivotally mounted in the outer gimbal about a cardan axis 58. The cardan axis 58 is perpendicular to the cardan axis 54. A torquer 60 acts between the outer housing 50 and the outer gimbal 52 about the cardan axis 54. A torquer 62 is attached to the outer gimbal 52 and acts between the outer gimbal 52 and the inner gimbal 56 about the cardan axis 58.

The inner gimbal 56 defines an intermediate housing 64. A gyro 66 is suspended in the intermediate housing 64 by means of a tape 68. As in the embodiment of FIG. 1, the gyro 66 has a gyro housing 67, in which the gyro rotor (not visible) is rotatably mounted and driven about a substantially horizontal spin axis 70. A mast 72 extending along the vertical, upward axis is attached to the gyro housing 67. The mast 72 is connected to the tape 68.

The intermediate housing 64 is restrained to a central position by springs 74.

A pick-off 76 is located in the region of the point of intersection of the cardan axes 54 and 58. The pick-off 76 responds to the movement of the gyro 66 relative to the oter housing 50. The signals from the pick-off 76 are applied, through a lead 78, to a controller 80 located in the outer housing. The controller 80 provides control signals which are applied to the torquer 60 and, through a flexible lead 82, to the torquer 62.

The operation of the tape-suspended gyro described with reference to FIGS. 2 and 3 will be explained hereinbelow with reference to the block diagrams of FIGS. 4 to 6.

An oscillation of the gyro 66 transversely to the upward axis relative to the outer housing 50 is detected by the pick-up 76 and is converted into signals indicative thereof. The signals cause control signals at the torquers 60 and 62 through the controller 80. The intermediate housing 64 is rotated through the torquers 60 and 62. Thereby, the suspension point 84 of the tape 68 is moved transversely to the vertical, upward axis. By appropriate design and dimensioning of the controller 80, the suspension point can be moved in such a way that this movement counter-acts the pendulous oscillations of the gyro and damps these oscillations.

Figure 4:
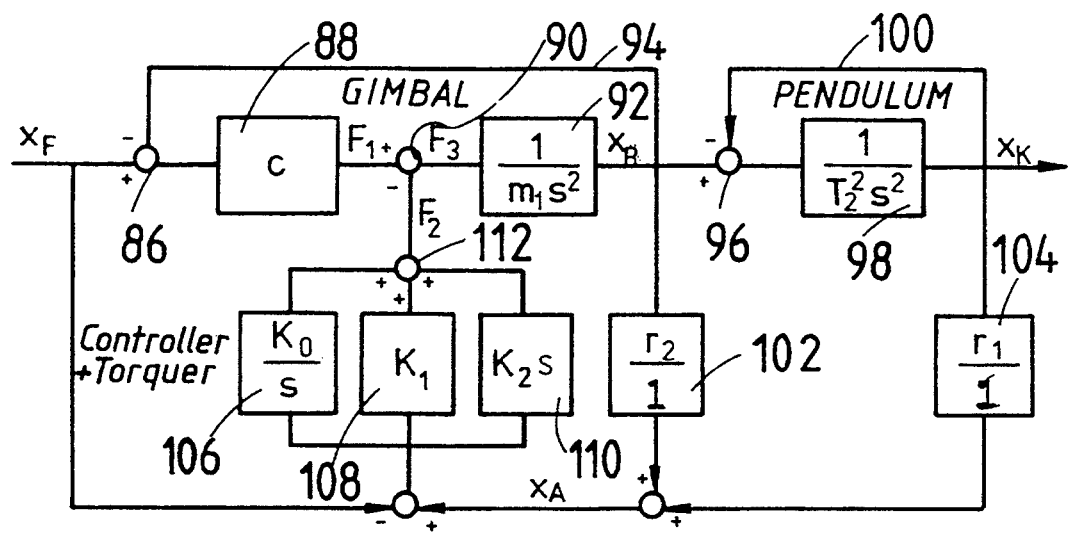
FIG. 4 is a block diagram and illustrates the structure of the control loop for actively damping the pendulous oscillations.
Figure 5:
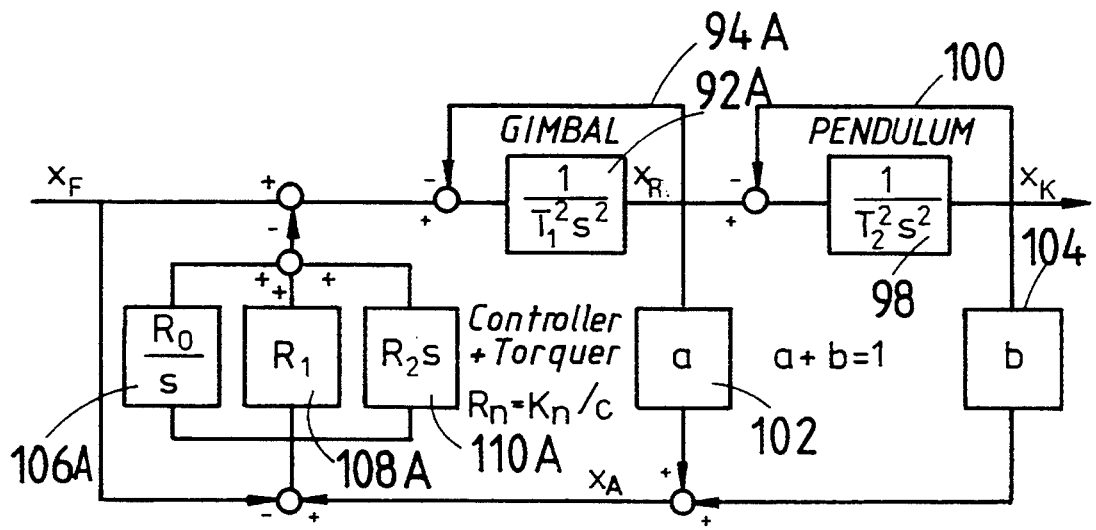
FIG. 5 is a re-drawn illustration of the control loop of FIG. 4.
Figure 6:
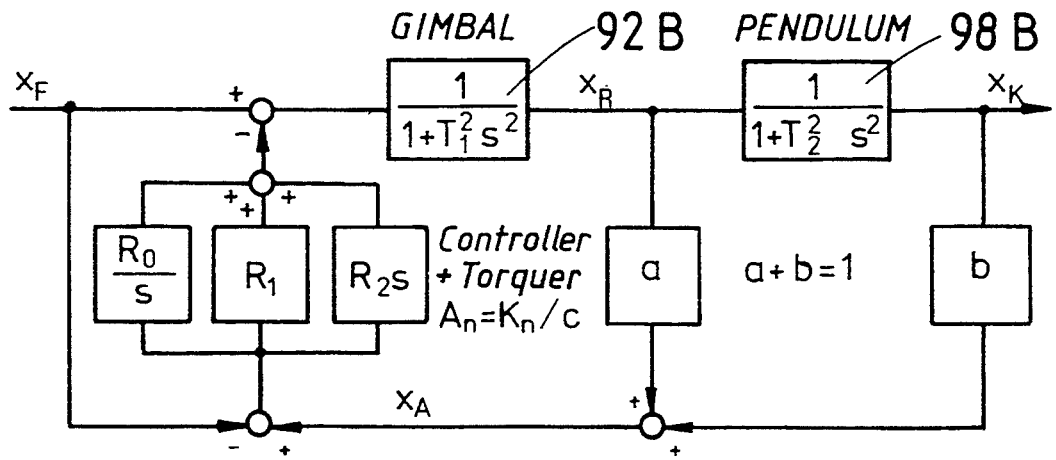
FIG. 6 is an again re-drawn illustration of the control loop of FIG. 4.

In FIG. 4 to 6, the following designations are selected:

c = spring constant of the springs 16 or 74, respectively,
l = reduced pendulum length
$m_1 = I_R/r_1^2$ the notional mass of the inner gimbal concentrated in the suspension point 84, the inner gimbal having the moment of inertia $I_R$ about the gimbal axis 58,
$m_2$ = the notional mass of the gyro pendulum formed by the gyro 66 concentrated at the distance of the reduced pendulum length from the suspension point 84,
$r_1$ = the distance of the suspension point 84 from the cardan axes 54 and 58,
$r_2 = l - r_1$
s = Laplace's operator,
$T_1 = \sqrt{m/c}$ i.e. the period of the rotary oscillations of the gimbal 56,
$T_2$ = period of oscillation of the gyro pendulum,
$x_A$ = path of a pendulum point in the plane of the cardan axes, $x_A = (x_K r_1 + x_R r_2)/l$, $x_F$ = path of the outer housing 50 (path of a vehicle containing the outer housing), $x_K$ = path of the mass $m_2$ of the gyro 66, $x_R$ = path of the suspension point 84 with the notional mass $m_1$ concentrated there.

FIG. 4 is a block diagram and illustrates the structure of the control loop "straight forward" without any transformation. The force of the spring 16 or 74, respectively, acts on the inner gimbal as outside force. This force $F_1$ is proportional, with the factor "c", to the difference of the path $x_F$ of the outer housing 50 and of the path $x_R$ throught which the inner gimbal 56 itself has moved. The forming of the difference corresponds to the summing point 86 in the block diagram of FIG. 4. The multiplication by the spring constant c is illustrated by block 88. Furthermore, the force $F_2$ exerted by the torquer 60 acts on the inner gimbal 56. This force $F_2$ counteracts the force $F_1$. This is illustrated by the summing point 90 in FIG. 4. These forces are counter-acted by the inertial force $F_3$ of the gimbal. The path $x_R$ results from the inertial force with the transfer function $1/m_1 s^2$. The transfer function is represented by block 92. The forming of the difference is symbolized by a loop 94 back to the summing point 86.

The movement $x_R$ of the inner gimbal 56 acts on the gyro pendulum which is formed by the gyro 66 and the tape 68. Again, only the path difference between the path $x_R$ of the suspension point 84 and the path or the position of the $x_K$ of the gyro 66 itself. This is illustrated by a summing point 96, at which the path $x_K$ is subtracted from the path $x_R$. The difference acts on the gyro pendulum which is represented by block 98 with a tranfer function $1/T_2^2 s^2$. The "output" $x_K$ is again fed back to the summing 96 by a loop 100.

The path $x_A$, which is measured by the pick-off 76 relative to the outer housing 50 is composed of a component which stems from the movement of the inner gimbal 56 and is proportional to $x_R$, and a component which stems from the pendulous movement of the gyro 66 and is proportional to $x_K$. The two components result from the paths $x_R$ and $x_K$ in accordance with geometrical relations by multiplication by $r_2/l$ and $r_1/l$, respectively. These multiplications are illustrated by blocks 102 and 104, respectively, in FIG. 4. The signals provided thereby at terminal 76 are applied to the controller 80. The controller 80 is a PID-controller, which transfers the input signal once with the transfer function $R_0/s$, once with the transfer function $R_1$ and once with the transfer function $R_2 s$. The transfer functions for the three components are illustrated by blocks 106, 108 and 110, respectively. The three components thus tranferred are superimposed. This is illustrated in FIG. 4 by a summing point 112. This yields the force $F_2$ exerted by the torquer 60.

The structure illustrated in FIG. 4 can be re-drawn in the manner illustrated in FIG. 5. The transfer functions in the blocks 88, 106, 108 and 110 can be divided by c. Instead, the transfer function in the block 92 can be multiplied by c. Then the transfer functions represented by blocks 106A, 108A and 110A result for the controller. The inner gimbal 56 is represented by block 92A with a transfer function of $1/T_1^2 s^2$ and a "feedback loop" 94A. Block 88 as factor "1" can be omitted.

The block diagram can be simplified still further:

The blocks 92A and 98 with the transfer functions $1/T_1^2 s^2$ and $1/T_2^2 s^2$, respectively, and the feedback loop 94A can be replaced by blocks 92B and 98B, respectively, having the transfer functions $1/(1+T_1^2 s^2)$ and $1/(1+T_2^2 s^2)$, respectively, without feedback loops 94A or 100, respectively.

The controller 80 is designed to provide optimal control behavior for such a controlled system.

I claim:

1. A tape suspended meridian gyro comprising:
   (a) an outer housing (10;50),
   (b) an intermediate housing (20;64) movably mounted in said outer housing (10;50),
   (c) a gyro (22;66), having a substantially horizontal spin axis (70), suspended in said intermediate housing (20;64) by means of a tape (24;68), and
   (d) a pick-off (40;76) which responds to deflection of said gyro (22;66), wherein
   (e) said pick-off (40;70) is arranged to detect transverse deflection of a substantially vertical upward axis of said gyro (22;66) from its central position,
   (f) said intermediate housing (20;64) is arranged to be moved by servo motor means (30, 32;60,62) transversely to said substantially vertical upward axis of said gyro (22;66), and
   (g) said servo motor means (30,32;60,62) are arranged to be energized by said pick-off (40;76) through a controller (44;80) to damp pendulous oscillations of said tape suspended gyro (22;66).

2. A tape suspended meridian gyro comprising:
   (a) an outer housing (10;50),
   (b) an intermediate housing (20;64) movably mounted in said outer housing (10;50),
   (c) a gyro (22;66), having a substantially horizontal spin axis (70), suspended in said intermediate housing (20;64) by means of a tape (24;68), and
   (d) a pick-off (40;76) which responds to deflection of said gyro (22;66), wherein
   (e) said pick-off (40;70) is arranged to detect transverse deflection of a substantially vertical upward axis of said gyro (22;66) from its central position,
   (f) said intermediate housing (20;64) is arranged to be moved by servo motor means (30, 32;60,62) transversely to said substantially vertical upward axis of said gyro (22;66),
   (g) said servo motor means (30,32;60,62) are arranged to be energized by said pick-off (40;76) through a controller (44;80) to damp pendulous oscillations of said tape suspended gyro (22;66)
   (h) said intermediate housing (20) comprises a carriage (14) which is guided in said outer housing (10) for horizontal movement with two degrees of freedom,
   (i) said carriage (14) is restrained in a central position by means of springs (16), and
   (j) said servo motor means comprises two linear actuators (30,32) which act upon said carriage (14) in two mutually orthogonal, horizontal directions.

3. A tape suspended meridian gyro as claimed in claim 2, characterized in that said actuators are moving coils.

4. A tape suspended meridian gyro as claimed in claim 2, characterized in that deflection of said vertical upward axis of said gyro (22) from its central position is detected by a carriage-fixed pick-off (40).

5. A tape suspended meridian gyro comprising:
   (a) an outer housing (10;50),
   (b) an intermediate housing (20;64) movably mounted in said outer housing (10;50), (c) a gyro (22;66), having a substantially horizontal spin axis (70), suspended in said intermediate housing (20;64) by means of a tape (24;68), and
(d) a pick-off (40;76) which responds to deflection of said gyro (22;66), wherein
(e) said pick-off (40;70) is arranged to detect transverse deflection of a substantially vertical upward axis of said gyro (22;66) from its central position,
(f) said intermediate housing (20;64) is arranged to be moved by servo motor means (30, 32;60,62) transversely to said substantially vertical upward axis of said gyro (22;66),
(g) said servo motor means (30,32;60,62) are arranged to be energized by said pick-off (40;76) through a controller (44;80) to damp pendulous oscillations of said tape suspended gyro (22;66),
(h) said intermediate housing (64) is provided in an inner gimbal (56) which is pivotally mounted about a first cardan axis (58) in an outer gimbal (52), said outer gimbal (52), in turn being pivotally mounted in said outer housing about a second cardan axis, which is orthogonal to said first cardan axis (58), and
(i) said servo motor means comprise a first torquer (62) acting between said inner gimbal (56) and said outer gimbal (52) about said first cardan axis (58), and a second torquer (60) acting between said outer gimbal (52) and said outer housing (50) bout said second cardan axis (54).

6. A tape suspended meridian gyro as claimed in claim 5, characterized in that said inner gimbal (56) is resiliently restrained in a central position in said outer housing (50).

7. A tape suspended gyro as claimed in claim 5, characterized in that said pick-off (76) is attached to said outer housing (50) to respond, on one hand, to deflections of a longitudinal axis of said tape (68) from a central position about a first axis, and to respond, on the other hand, to deflections of said tape axis about a second axis perpendicular to said first axis, said pick-off being connected to apply corresponding signals to said first and second torquers (62,60), respectively.

8. A tape suspended meridian gyro as claimed in claim 7, characterized in that said pick-off is located in the point of intersection of said cardan axes (58,54).

* * * * *